(12) United States Patent
Robsahm

(10) Patent No.: US 7,774,775 B2
(45) Date of Patent: Aug. 10, 2010

(54) METHOD AND SYSTEM FOR REVISING INSTALLATION SOFTWARE

(75) Inventor: Christian C. Robsahm, Phoenix, AZ (US)

(73) Assignee: Siebel Systems, Inc., San Mateo, CA (US)

( * ) Notice: Subject to any disclaimer, the term of this patent is extended or adjusted under 35 U.S.C. 154(b) by 1551 days.

(21) Appl. No.: 10/928,377

(22) Filed: Aug. 27, 2004

(65) Prior Publication Data

US 2007/0226726 A1 Sep. 27, 2007

Related U.S. Application Data

(60) Provisional application No. 60/551,693, filed on Mar. 10, 2004.

(51) Int. Cl.
*G06F 9/44* (2006.01)
*G06F 9/445* (2006.01)

(52) U.S. Cl. ........................ 717/174; 717/175; 717/176; 717/177; 717/178; 717/171; 717/168

(58) Field of Classification Search ................. 717/178, 717/176, 173
See application file for complete search history.

(56) References Cited

U.S. PATENT DOCUMENTS

| | | | | |
|---|---|---|---|---|
| 6,199,204 B1 * | 3/2001 | Donohue | ..................... | 717/178 |
| 6,202,207 B1 * | 3/2001 | Donohue | ..................... | 717/173 |
| 6,324,691 B1 * | 11/2001 | Gazdik | ..................... | 717/178 |
| 6,434,744 B1 * | 8/2002 | Chamberlain et al. | ........ | 717/168 |
| 6,550,061 B1 * | 4/2003 | Bearden et al. | ............. | 717/174 |
| 2003/0145317 A1 * | 7/2003 | Chamberlain | ................ | 717/177 |
| 2003/0163807 A1 * | 8/2003 | Drake et al. | ................. | 717/174 |
| 2004/0034850 A1 * | 2/2004 | Burkhardt et al. | ........... | 717/120 |
| 2004/0060035 A1 * | 3/2004 | Ustaris | ..................... | 717/100 |
| 2004/0210893 A1 * | 10/2004 | Chamberlain et al. | ........ | 717/168 |
| 2005/0039193 A1 * | 2/2005 | Choi et al. | ................... | 719/321 |
| 2005/0102669 A1 * | 5/2005 | Marney et al. | .............. | 717/174 |
| 2005/0132359 A1 * | 6/2005 | McGuire et al. | ............. | 717/175 |

* cited by examiner

*Primary Examiner*—Insun Kang
(74) *Attorney, Agent, or Firm*—Campbell Stephenson LLP

(57) ABSTRACT

A method and system for revising installation software is disclosed. The method includes causing an installation program to configure at least a portion of the installation program using an update. An example of a system of the present invention is an installation architecture. Such an installation architecture includes an installation program. The installation program is configured to update at least a portion of the installation program.

57 Claims, 6 Drawing Sheets

METHOD AND SYSTEM FOR REVISING INSTALLATION SOFTWARE

CROSS-REFERENCE TO RELATED APPLICATIONS

This invention claims priority from Provisional Patent Application Ser. No. 60/551,693, entitled "Method and System for Revising Installation Software", filed Mar. 10, 2004, and naming Christian C. Robsahm as inventor. This provisional patent application has as its assignee Siebel Systems, Inc., the assignee of the present invention. This provisional patent application is incorporated herein by reference, in its entirety and for all purposes.

BACKGROUND OF THE INVENTION

1. Field of the Invention

The present invention relates to the installation of software, and, more particularly, to a method and system for revising installation software.

2. Description of the Related Art

Currently, software installation routines are not "patchable". In other words, the installation software's routines cannot be changed to address problems that occur in the process of installing a software program (software product) after the installation software has been shipped to end-users (i.e., customers). This means that if an error ("bug") is found in the installation software or the software product's configuration process, after that software product ships, there is no way to resolve the defect without sending new installation software. Typically, in the normal course of developing and marketing software products, this does not occur until the next release of the software product. Such situations thus require that each such situation be addressed on a case-by-case basis, a time-consuming and expensive course of action. As will be appreciated, this not only impacts software developers, but can potentially have major adverse effects for end-users who cannot install a given software product, because such end-users are affected by the defect. What is needed is an approach that allows installation software to download and execute new installation software that addresses the defect causing the error.

SUMMARY OF THE INVENTION

In one embodiment, a method is disclosed. The method includes causing an installation program to configure at least a portion of the installation program using an update.

In another embodiment, a installation architecture is disclosed. The installation architecture includes an installation program. The installation program is configured to update at least a portion of the installation program.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawings.

The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Introduction

The present invention provides for an installation program that is capable of determining that an installation error has occurred (or will occur) and of updating itself to avoid such an error. Such an installation program then re-starts itself with the update, and in so doing, successfully completes the installation of software components desired by an end-user. This has traditionally been a difficult problem because an error in an installation process that was the result of errors in the installation software employed were only correctable by the software manufacturer manually providing a completely new installation program. This led to delays and a poor end-user experience, which cost the software manufacturer time, resources and, ultimately, customers. The present invention addresses these issues by allowing an installation program to correct such errors on-the-fly, with minimal end-user intervention, thereby improving the end-user's experience via the successful installation of the desired software components.

An Example Architecture for Revising Installation Software

Figure 1:
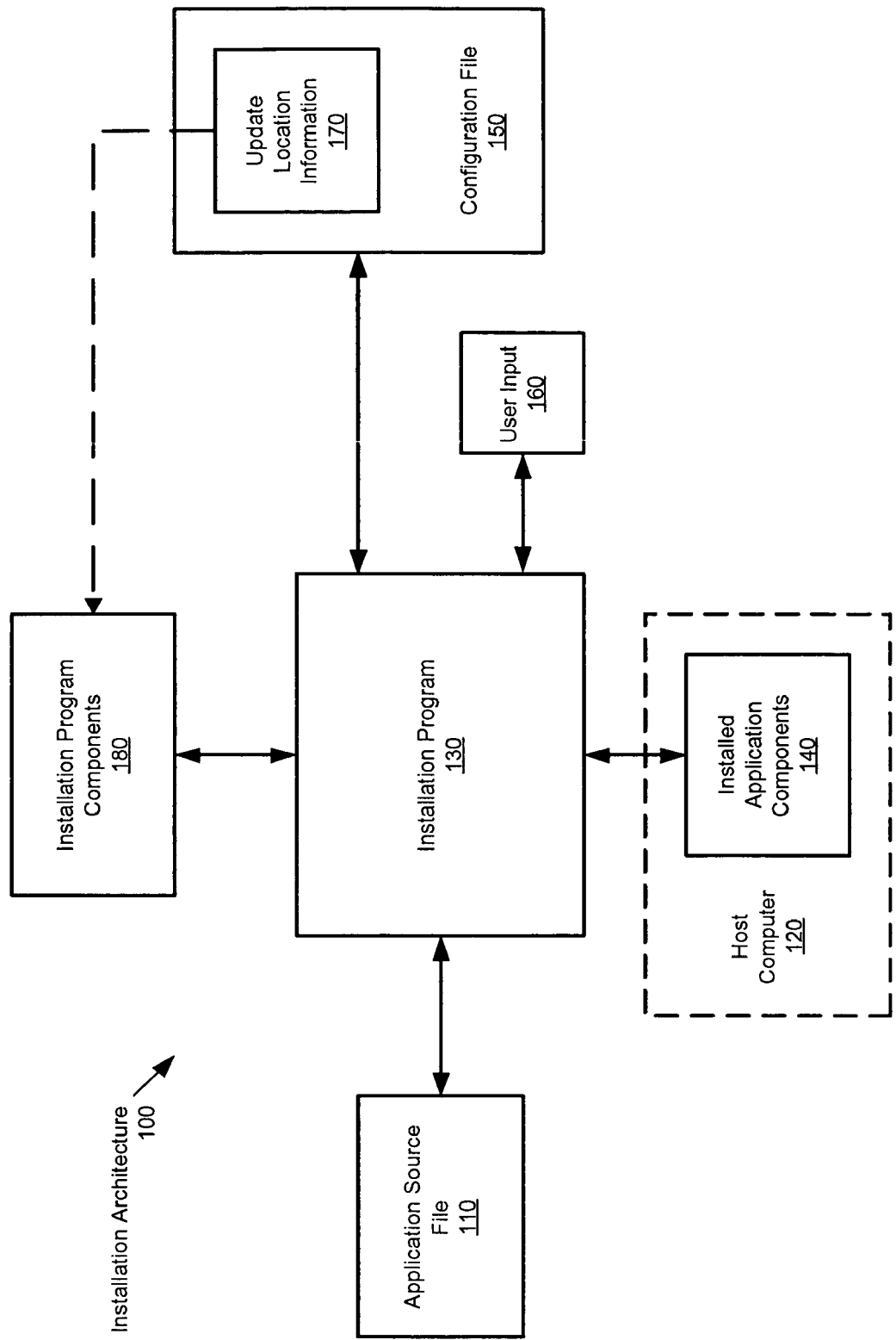
FIG. 1 is a block diagram of an installation architecture.

FIG. 1 is a block diagram of an installation architecture 100 according to the present invention. In installation architecture 100, an application source file 110 includes the modules necessary to install a running application onto a host computer 120. An installation program 130 installs the components in application source file 110 onto host computer 120, which appears as installed application components 140. Installation program 130 stores the components in application source file 110 on a computer-readable storage medium of host computer 120. Such a computer-readable storage medium may be implemented as floppy disks, optical disks, CD-ROMS, magnetic-optical disks, read-only memories (ROMs), random access memories (RAMs), EPROMs, EEPROMs, magnetic or optical cards, or the like. Installation program 130 can itself also be stored on such a computer-readable storage medium. This allows the execution of computer code, encoded in the computer-readable storage medium, to cause installation program 130 to configure at least a portion of installation program 130 using an update. As will be appreciated, installation program 130 can be executed by a processor of such a computer system. Installation program 130 is controlled by a configuration file 150 and user input 160. Configuration file 150, according to the present invention, includes update location information 170. Update location information 170 provides information to installation program 130 regarding the location of installation program components 180.

In installation architecture 100, installation program components 180 include one or more updates that allow installation program 130 to successfully complete the installation of the components from application source file 110 onto host computer 120. This is a particularly important feature in the case where installation program 130 is unable to successfully install the components within application source file 110. In such case, a traditional installation program must be manually replaced with an updated installation program in order to cure defects in that installation program. By contrast, installation program 130 is able to correct such defects dynamically, by gaining access to installation program components 180 via information contained in configuration file 150 or input as user input 160. Installation program 130 is configured to use information regarding the location of replacement components (e.g., user input 160 or update location 170) in order to locate those replacement components (e.g., installation program components 180). Installation program components 180 may be stored in any location accessible by installation program 130. User input 160 and/or update location information 170 provides installation program 130 with the location of installation program components 180 in one of any number of ways, including a directory/file name combination, a universal resource locator (URL) or other such mechanisms.

Figure 2:
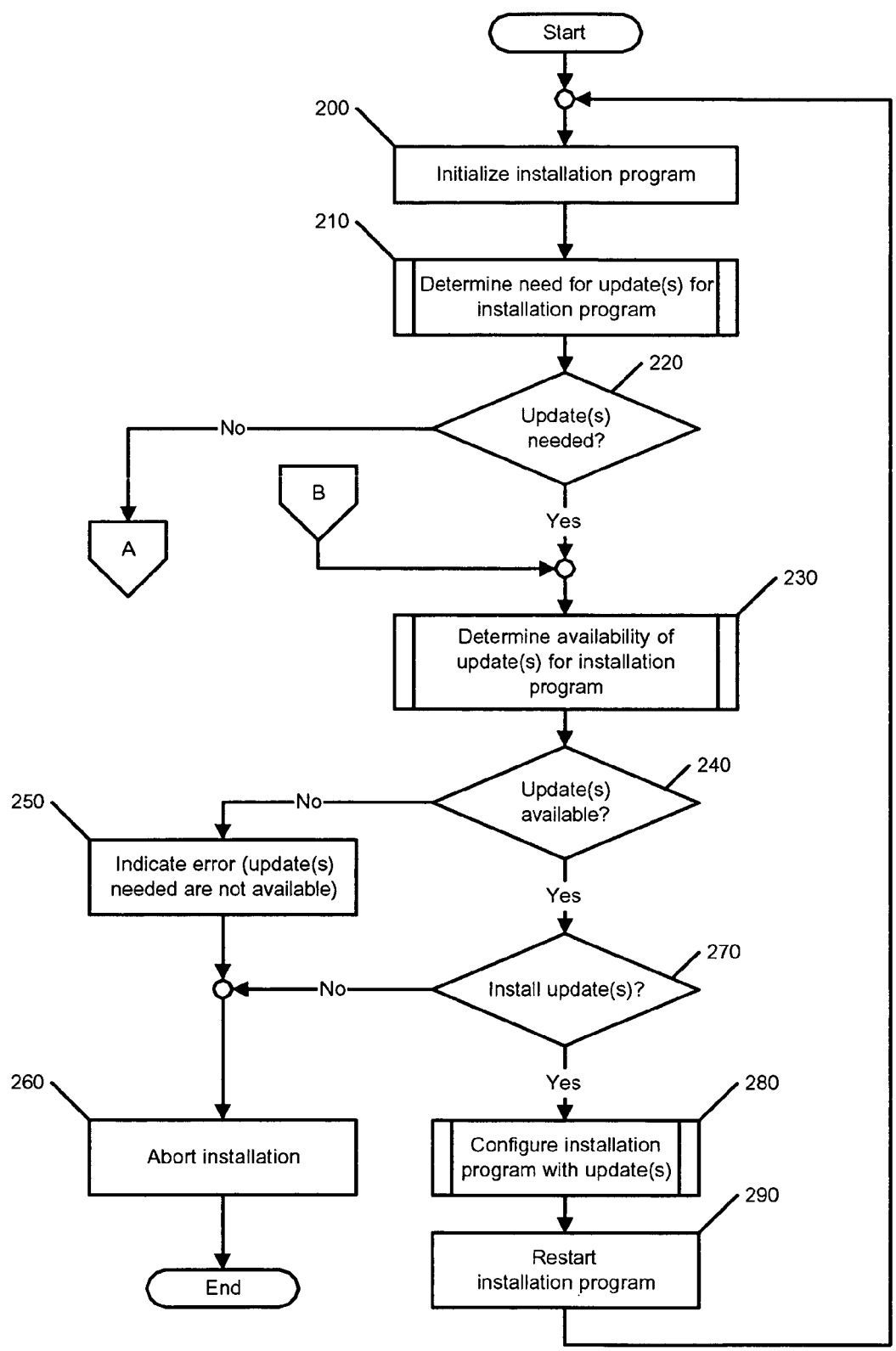
FIG. 2 is a flow diagram illustrating the overall process for updating an installation program according to the present invention.

FIG. 2 is a flow diagram illustrating the overall process for updating an installation program according to the present invention. The process begins with the initialization of the installation program (step 200). Once the installation program has been initialized, the installation program determines whether or not any update(s) are needed (step 210). The process of making such a determination is described in greater detail in connection with FIG. 4. Once this determination is made, a decision is reached as to whether the update(s) for the installation program are needed (step 220). If no updates are needed, the process proceeds to connector A, which connects the flow diagram of FIG. 2 to that of FIG. 3, in connection with which the process of performing the installation is discussed in greater detail. If the determination made indicates that updates are needed, a determination is then made as to the availability of such updates for the installation program (step 230). If such updates are not available (step 240), an indication is made to the user that needed updates are not available (step 250). The installation process is then aborted (step 260).

If the requisite updates are available (steps 230 and 240), a determination is made as to whether the user wishes those updates to be installed (step 270). If the updates are needed and available, but the user does not wish to install them, the installation process is aborted (step 260). If the updates are needed and are available, and the user wishes to install these updates, the process of configuring the installation program with the necessary updates is performed (step 280). The process of configuring the installation program with the requisite updates is discussed in greater detail in connection with FIG. 6. Once the installation program is configured with the requisite updates, the installation program is then restarted (step 290) and the process begins anew.

Figure 3:
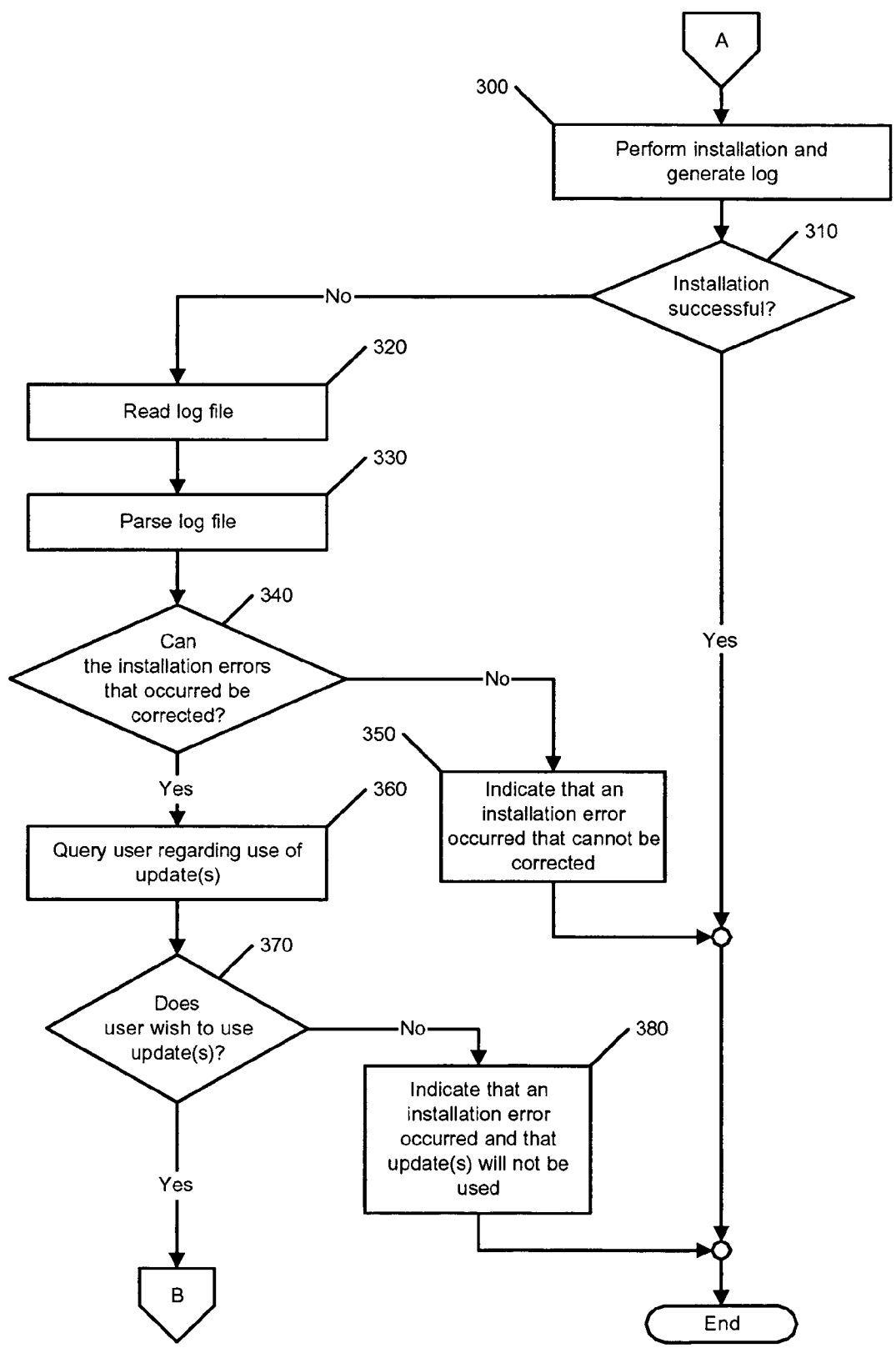
FIG. 3 is a flow diagram illustrating a process of performing an installation and recovering from a failure in that installation, according to embodiments in the present invention

FIG. 3 is a flow diagram illustrating a process of performing an installation and recovering from a failure in that installation, according to embodiments in the present invention. It will be noted that the process of actually performing the installation begins at connector A, which is arrived at by way of step 220 of FIG. 2, as noted earlier. The process begins with the installation program's performing the installation of the application components onto a host computer (step 300). During the installation process, an installation log is generated, which maintains information regarding the progress of the installation in terms of the actions performed, the results of those actions, and so on.

A determination is then made as to whether the installation was successful (step 310). If the installation is successful, the process is at an end and the installation is complete. However, if the installation is not successful, the log file generated during the installation is read (step 320), and the information thus read is parsed to allow for the identification of the errors that caused the installation process' failure (step 330). A determination is then made as to whether the installation errors that occurred can be corrected (step 340). If the installation errors that occurred cannot be corrected, an indication is made that an uncorrectable installation error has occurred (step 350). Again, the process is at an end, although the software package has not been successfully installed.

However, if the installation errors that occurred can be corrected, the process then queries the user regarding the use of updates to make such corrections (step 360). If the user does not wish to employ the updates (step 370), an indication is made that an installation error occurred and that any update(s) that might be available will not be used to correct the error (step 380). Once again, the process ends with the software package having not been successfully installed. However, if the user does wish to use the updates that may be available to correct the installation error, the process proceeds to connector B and so back to step 230 of FIG. 2. In this manner, the need for updates to the installation program and the user's desire to implement such updates are determined and implemented.

Figure 4:
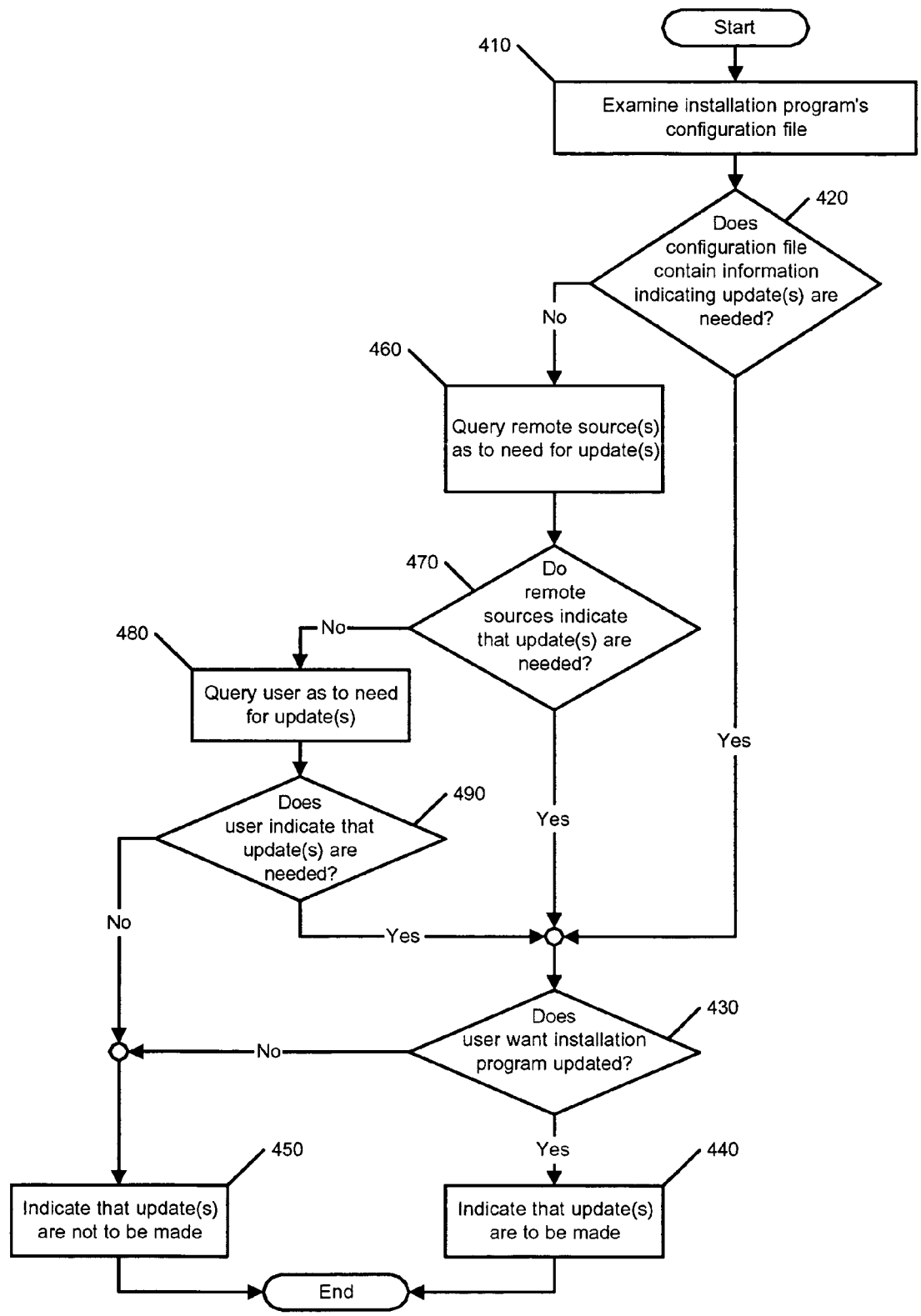
FIG. 4 is a flow diagram illustrating a process for the determination as to the need for updates to an installation program according to the present invention.

FIG. 4 is a flow diagram illustrating a process for the determination as to the need for updates to an installation program according to the present invention. The process begins with the examination of the installation program's configuration file (step 410). The determination is then made as to whether the configuration file contains information indicating that one or more updates are needed (step 420). If the configuration file indicates that updates are needed, the user is queried as to whether the user desires the installation program to be updated (step 430). If the user desires that the installation program be updated, an indication is made to that effect (step 440). If the user does not want the installation program updated, an indication is made to that effect (step 450).

If the configuration file does not contain information indicating that one or more updates are needed (step 420), one or more remote sources are queried as to the need for updates (step 460). Such remote resources can be a website, an FTP site, information accessible by a virtual private network (VPN) or other such remote source. A determination is then made as to whether the remote sources indicate that one or more updates are needed (step 470). If the remote sources indicate that updates are needed, the user is queried as to whether the installation program should be updated (step 430). Again, if the user indicates that the installation program is to be updated, an indication to that effect is made (step 440). Otherwise, an indication is made that the installation program is not to be updated (step 450).

If no indication is available from remote sources with regard to the need for updates to the installation program, the user is queried as to the need for such updates (step 480). A determination is then made as to whether the user has indicated that such updates are needed (step 490). If the user has indicated that no updates are needed, an indication is made to that effect (step 450). Otherwise, the user is again queried, in this instance with regard to whether the user desires those updates be made to the installation program (step 430). As before, if the user indicates that such updates are to be made, an indication is made to this effect (step 440), and otherwise, an indication is made that the updates are not to be made to the installation program (step 450).

Figure 5:
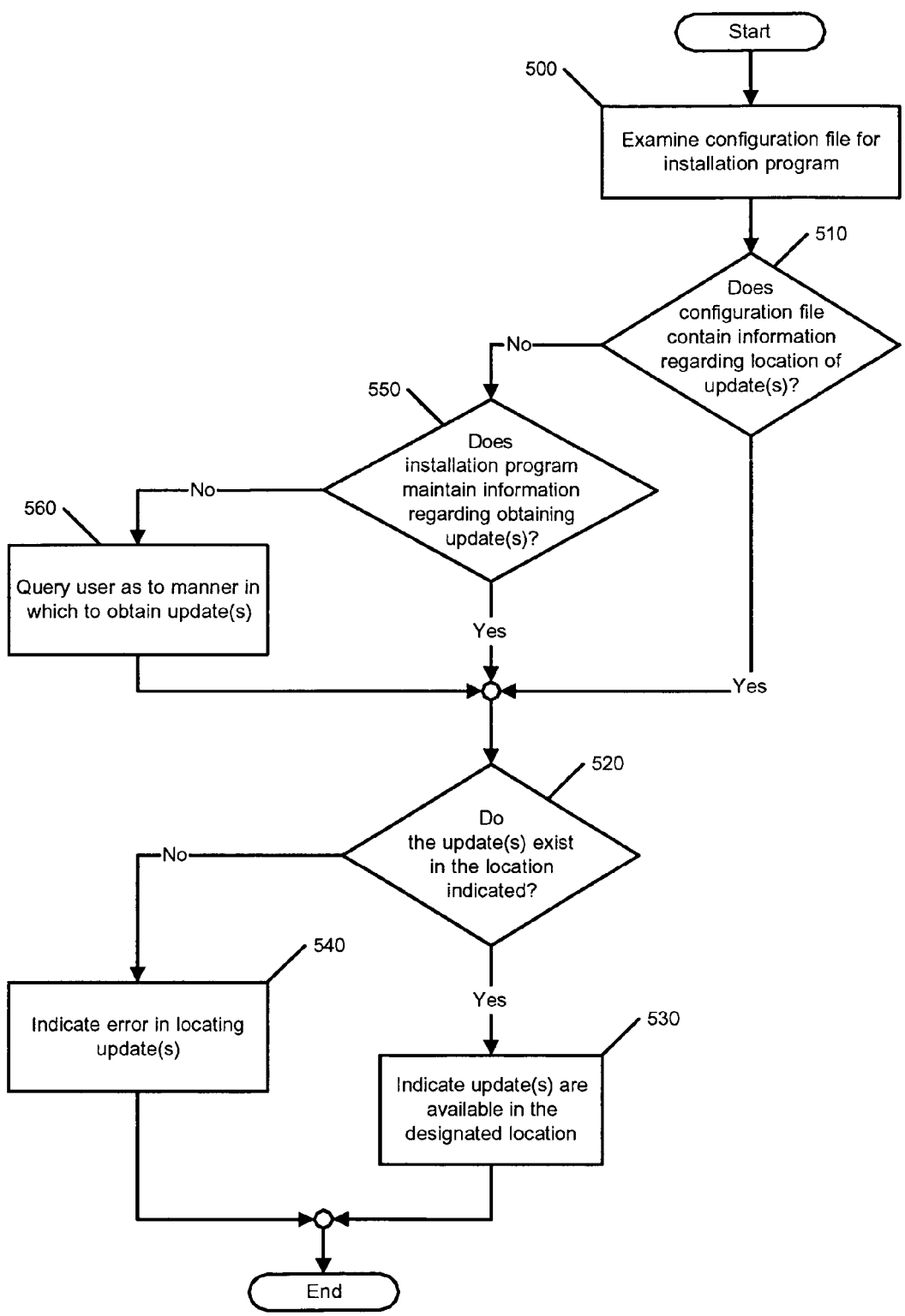
FIG. 5 is a flow diagram illustrating a process for determining the availability of updates to an installation program, according to the present invention.

FIG. 5 is a flow diagram illustrating a process for determining the availability of updates to an installation program, according to the present invention. The process begins with the examination of the installation program's configuration file (step 500). A determination is then made as to whether the configuration file contains information regarding the location of these updates (step 510). If the configuration file does contain information regarding the location of these updates, a determination is then made as to whether the updates exist in the location indicated (step 520). For example, the installation program's configuration file may contain the location of such updates within a file system. Alternatively, the configuration file may contain a URL that points to the (expected) location of the updates.

However, for any number of reasons, the desired updates may not exist at the designated location. Thus, a determination must be made as to the updates' existence. If the updates previously indicated are available in the designated location, an indication to this effect is provided (step 530). However, if the updates do not exist in the location indicated, the occurrence of an error in locating the requisite updates is indicated (step 540).

If the installation program's configuration file does not contain information regarding the location of the requisite updates, a determination is made as to whether the location of such updates is maintained within the installation program itself (step 550). This might be the case, for example, where a standard location on the internet (e.g., as indicated by a hard-coded URL within the installation program) is employed. As before, if such information is made available in this manner, a determination is made as to the existence of such updates in the indicated location (step 520). Also as before, an error is indicated if the requisite updates do not exist in the designated location (step 540), and otherwise, an indication is made that the requisite updates are available at the designated location (step 530).

Alternatively, the user may be queried as to the manner in which the updates may be obtained (step 560). As before, a determination is then made as to the existence of the updates at the indicated location (step 520). Also as before, an indication is then made as to the updates having been located (step 530) or not (step 540).

Figure 6:
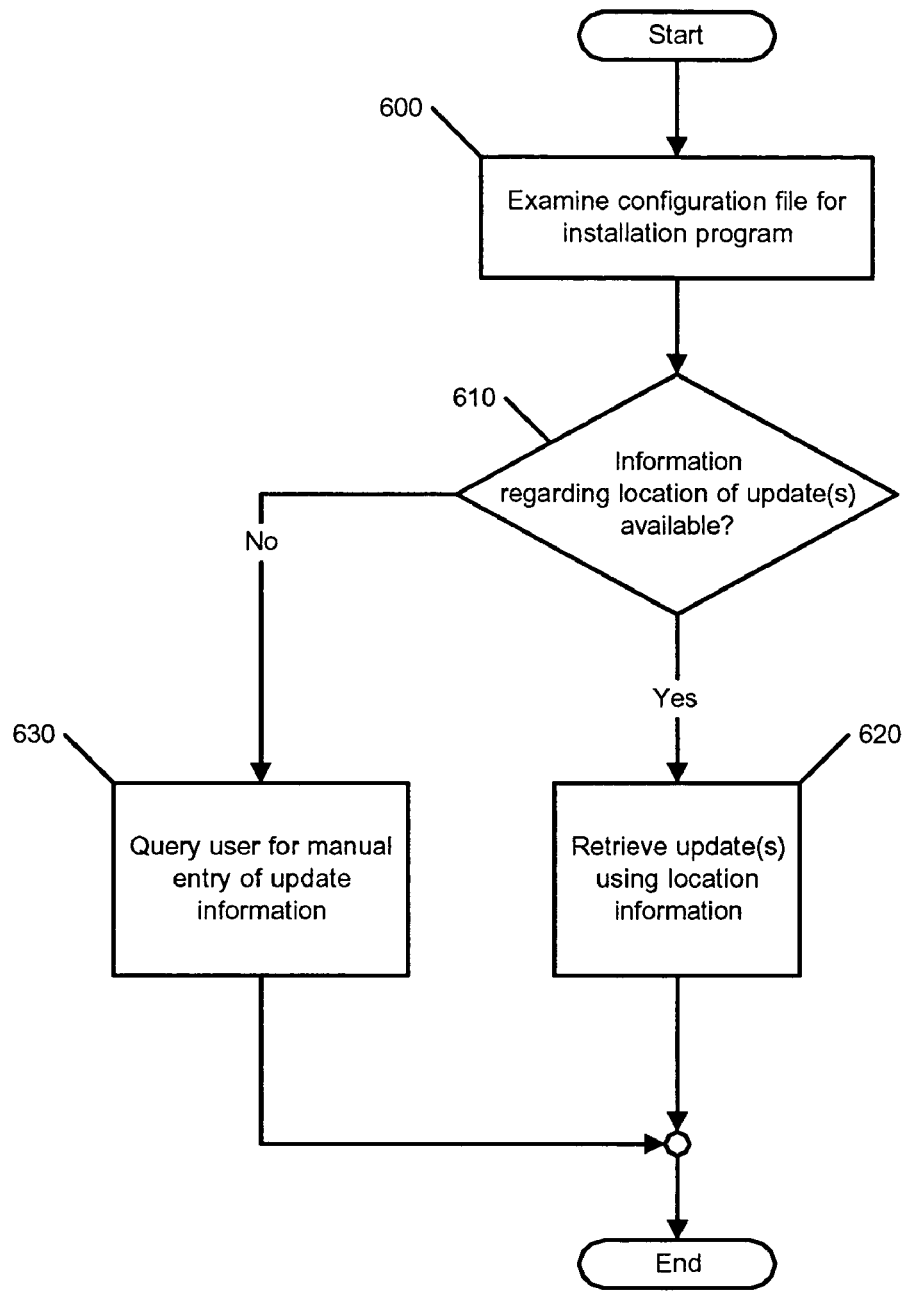
FIG. 6 is flow diagram illustrating a process for configuring an installation program with updates according to the present invention.

FIG. 6 is flow diagram illustrating a process for configuring an installation program with updates according to the present invention. The process begins with the examination of the installation program's configuration file (step 600). A determination is then made as to whether information regarding the location of the requisite updates is available (step 610). If such information is available, the updates are retrieved using the location information previously determined (step 620). Otherwise, the user is queried for manual entry of the update information (step 630).

The foregoing processes, embodied in the flow diagrams of FIGS. 2, 3, 4, 5 and 6, can be implemented using an installation program written in the Java® programming language, and in particular, through the use of Java® classpaths. By either altering the classpath variable(s), or the components maintained therein, the installation program is able to alter itself. In so doing, the installation software removes the component(s) containing the error(s), and is then able to successfully install the desired software components. The following pseudocode is one implementation of such a solution:

```
Initialize( ){
.
.
.
//check for updates.
String result = GetIniFileValue("Updates","Installer");
// only proceed if the update entry exists and
// if the command line does not have the update keyword.
// the update key word indicates the installation was
// re-started with an update.
If(result != null && CommandLine.indexOf("update=true") <0){
    // URL found, check for update
    File update = new File(url);
    If(update.exists( )){
        // the update exists, Ask the user if
        // they want to download and use the update.
        Boolean result = DisplayDialog("Update");
        If(result){
            // the user wants to download the update
            // download and re-start installation with
            // updates.
            If (!CopyFile(update, tempdir + fs + "update.jar")){
                // update the class path with the new jar file.
                String classpath = tempdir + fs + update.jar + ";"
+ javaclasspath.
                // re-execute installer with the new class path.
                LaunchApplication(setup.exe + " -cp " + classpath +
" -args update=true")
                // terminate current instance.
                System.exit(0);
        }else{
        //copy error
        }
            }
        }else
            //update file does not exist error
    }
} // no updates found or already running with update,
    // continue with normal execution.
.
.
.
}
```

As will be appreciated, the above pseudocode makes use of the fact that Java® employs classpaths, which allows components of such an installer to be easily replaced. Alternatively, such methods can be used in other systems and with other languages, simply by employing a modular approach in implementing the installation program.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Moreover, while the invention has been particularly shown and described with reference to these specific embodiments, it will be understood by those skilled in the art that the foregoing and other changes in the form and details may be made therein without departing from the spirit or scope of the invention.

What is claimed is:

1. A method, implemented in a computer system, comprising:
   causing an installation program to perform an installation process using a processor of said computer system; and
   upon a failure in said installation process,
      identifying an error that caused said failure,
      determining if said error can be corrected by installing an update to said installation program, wherein said identifying and determining are performed by the installation program,
      if said determining indicates said error can be corrected by installing said update,
         causing said installation program to dynamically configure at least a portion of said installation program, wherein
            said installation program performs said configuring using said update.

2. The method of claim 1, further comprising:
   performing said installation process by restarting said installation program,
   wherein
      said at least said portion of said installation program has been configured using said update.

3. The method of claim 1, further comprising:
   determining if said at least said portion of said installation program should be configured using said update.

4. The method of claim 3, wherein
   said update comprises an installation program component.

5. The method of claim 3, wherein said determining comprises:
   querying a remote source to determine if said at least said portion of said installation program should be configured using said update.

6. The method of claim 3, wherein said determining comprises:
   detecting a failure of said installation process performed by said installation program.

7. The method of claim 6, further comprising:
   causing said installation program to perform said configuring, using said processor, in response to said detecting.

8. The method of claim 3, wherein said determining comprises:
   querying a user to determine if said at least said portion of said installation program should be configured using said update.

9. The method of claim 3, further comprising:
   determining availability of said update.

10. The method of claim 9, further comprising:
    installing said update.

11. The method of claim 3, further comprising:
    determining said error from a log file.

12. The method of claim 11, wherein said determining comprises:
    reading said log file, and
    parsing said log file.

13. The method of claim 3, further comprising:
    determining if said error can be corrected by one of a plurality of updates,
       wherein said updates comprise said update to said installation program.

14. The method of claim 13, further comprising:
    identifying said update by selecting said update to said installation program from
       said updates, wherein
          said update is said update to said installation program.

15. The method of claim 3, further comprising:
    performing said causing said installation program to configure said at least said portion of installation program using said update, if said installation process can be corrected by said update to said installation program, wherein
       said update is said update to said installation program.

16. The method of claim 3, further comprising:
    determining a location of said update.

17. The method of claim 16, wherein said determining said location comprises at least one of:
    determining if said location is identified in a configuration file,
    determining if said installation program includes said location, and
    determining said location by querying a user.

18. The method of claim 1, further comprising:
    prior to performing said installation process, determining that said failure will occur.

19. An installation architecture comprising:
    an installation program; and
    a processor configured to execute said installation program, wherein
       said installation program is configured to perform an installation process using said processor; and
       upon a failure in said installation process,
          said installation program is configured to identify an error that caused said failure,
          said installation program is configured to determine if said error can be corrected by installing an update to said installation program,
          if said determining indicates said error can be corrected by installing said update,
             said installation program is dynamically configured to update at least a portion of said installation program, wherein said installation program performs said updating using said update.

20. The installation architecture of claim 19, further comprising:
    an application source file, wherein
       said application source file comprises an application component, and
       said installation program is further configured to install said application component.

21. The installation architecture of claim 19, further comprising:
    an installation program component, wherein
       said installation program is configured to access said installation program component, and
       said installation program is configured to perform said configuration of said at least said portion of said installation program using said installation program component.

22. The installation architecture of claim 21, further comprising:
    a configuration file, wherein
       said configuration file comprises update location information,
       said update location information indicates a location of said installation program component,
       said installation program is configured to access said configuration file, and
       said installation program is configured to determine said location using said update location information.

23. The installation architecture of claim 22, further comprising:
    a plurality of installation program components, wherein
       said installation program components comprise said installation program component.

24. The installation architecture of claim 23, wherein
said installation program is configured to select at least one of said installation program components.

25. The installation architecture of claim 22, further comprising:
an application source file, wherein
said application source file comprises an application component, and
said installation program is further configured to install said application component.

26. The installation architecture of claim 25, further comprising:
a host computer,
said installation program is further configured to install said application component on said host computer.

27. The installation architecture of claim 26, wherein
installation of said application component on said host computer by said installation program results in an installed application component being installed on said host computer.

28. A computer system comprising:
a processor;
computer readable storage medium coupled to said processor; and
computer code, encoded in said computer readable storage medium, comprising an installation program and configured to cause said processor to:
cause said installation program to perform an installation process using said processor; and
upon a failure in said installation process,
cause said installation program to identify an error that caused said failure,
cause said installation program to determine if said error can be corrected by installing an update to said installation program,
if said determining indicates said error can be corrected by installing said update,
cause said installation program to dynamically configure at least a portion of said installation program, wherein said installation program performs said configuring using said update.

29. The computer system of claim 28, wherein said computer code is further configured to cause said processor to:
determine if said at least said portion of said installation program should be configured using said update.

30. The computer system of claim 29, wherein said computer code configured to cause said processor to perform said determining is further configured to cause said processor to:
detect a failure of said installation process performed by said installation program.

31. The computer system of claim 30, wherein said computer code is further configured to cause said processor to:
cause said installation program, in response to a detection of said failure, to execute said computer code configured to cause said installation program to configure said at least said portion of said installation program using said update.

32. The computer system of claim 29, wherein said computer code is further configured to cause said processor to:
determine an availability of said update.

33. The computer system of claim 32, wherein said computer code is further configured to cause said processor to:
install said update.

34. The computer system of claim 29, wherein said computer code is further configured to cause said processor to:
determine if said error can be corrected by one of a plurality of updates, wherein
said updates comprise said update to said installation program, and
said update is said update to said installation program.

35. The computer system of claim 29, wherein said computer code is further configured to cause said processor to:
execute said computer code configured to cause said processor to cause said installation program to configure said at least said portion of said installation program using said update, if said installation process can be corrected by said update to said installation program, wherein
said update is said update to said installation program.

36. The computer system of claim 29, wherein said computer code is further configured to cause said processor to:
determine a location of said update.

37. The computer system of claim 36, wherein said computer code configured to determine said location of said update is further configured to cause said processor to perform at least one of:
determining if said location is identified in a configuration file,
determining if said installation program includes said location, and
determining said location by querying a user.

38. A computer program product comprising:
an installation program, wherein said installation program comprises
a first set of instructions, executable on a computer system, configured to cause said installation program to perform an installation process using said processor; and
upon a failure in said installation process,
cause said installation program to identify an error that caused said failure,
cause said installation program to determine if said error can be corrected by installing an update to said installation program,
if said determining indicates said error can be corrected by installing said update,
cause said installation program to dynamically configure at least a portion of said installation program, wherein said installation program performs said configuring using said update; and
a computer readable storage medium, wherein said installation program is encoded in said computer readable storage medium.

39. The computer program product of claim 38, wherein said installation program further comprises:
a second set of instructions, executable on said computer system, configured to determine if said at least said portion of said installation program should be configured using said update.

40. The computer program product of claim 39, wherein said second set of instructions comprises:
a first subset of instructions, executable on said computer system, configured to detect a failure of said installation process performed by said installation program.

41. The computer program product of claim 40, wherein said installation program further comprises:
a third set of instructions, executable on said computer system, configured to cause said installation program, in response to a detection of said failure, to execute said first set of instructions.

42. The computer program product of claim 39, wherein said installation program further comprises:
a third set of instructions, executable on said computer system, configured to determine an availability of said update.

43. The computer program product of claim 42, wherein said installation program further comprises:
a fourth set of instructions, executable on said computer system, configured to install said update.

44. The computer program product of claim 42, wherein said installation program further comprises:
a fourth set of instructions, executable on said computer system, configured to determine if said error can be corrected by one of a plurality of updates, wherein
said updates comprise said update to said installation program, and
said update is said update to said installation program.

45. The computer program product of claim 42, wherein said installation program further comprises:
a fourth set of instructions, executable on said computer system, configured to execute said first set of instructions, if said installation process can be corrected by said update to said installation program, wherein said update is said update to said installation program.

46. The computer program product of claim 39, wherein said installation program further comprises:
a third set of instructions, executable on said computer system, configured to determine a location of said update.

47. The computer program product of claim 46, wherein said third set of instructions comprises:
a first subset of instructions, executable on said computer system, configured to perform at least one of:
determining if said location is identified in a configuration file,
determining if said installation program includes said location, and
determining said location by querying a user.

48. An apparatus comprising:
a processor;
a computer readable storage medium coupled to said processor;
means for causing an installation program stored on the computer readable storage medium to perform an installation process using said processor; and
upon a failure in said installation process,
means for causing said installation program to identify an error that caused said failure,
means for causing said installation program to determine if said error can be corrected by installing an update to said installation program,
means for causing said installation program to dynamically configure at least a portion of said installation program, using said processor, if said means for determining indicates said error can be corrected by installing said update, wherein
said means for causing is coupled to said processor and said computer readable storage medium, and
said installation program performs said configuring using said update.

49. The apparatus of claim 48, further comprising:
means for determining if said at least said portion of said installation program should be configured using said update.

50. The apparatus of claim 49, wherein said means for determining further comprises:
means for detecting a failure of said installation process performed by said installation program.

51. The apparatus of claim 50, further comprising:
means for causing said installation program to perform said configuring, using said processor, in response to said detecting.

52. The apparatus of claim 49, further comprising:
means for determining an availability of said update.

53. The apparatus of claim 52, further comprising:
means for installing said update.

54. The apparatus of claim 49, further comprising:
means for determining if said error can be corrected by one of a plurality of updates, wherein
said updates comprise said update to said installation program, and
said update is said update to said installation program.

55. The apparatus of claim 49, further comprising:
means for performing said causing said installation program to configure said at least said portion of installation program using said update, if said
installation process can be corrected by said update to said installation program, wherein
said update is said update to said installation program.

56. The apparatus of claim 49, further comprising:
means for determining a location of said update.

57. The apparatus of claim 56, wherein said means for determining said location comprises at least one of:
means for determining if said location is identified in a configuration file,
means for determining if said installation program includes said location, and
means for determining said location by querying a user.

* * * * *